United States Patent [19]

Ketchpel

[11] Patent Number: 4,930,227
[45] Date of Patent: Jun. 5, 1990

[54] COILABLE TAPE RULE WITH IMPROVED END HOOK

[75] Inventor: Paul A. Ketchpel, Simsbury, Conn.
[73] Assignee: The Stanley Works, New Britain, Conn.
[21] Appl. No.: 313,723
[22] Filed: Feb. 21, 1989
[51] Int. Cl.⁵ .............................................. G01B 3/10
[52] U.S. Cl. ...................................... 33/755; 33/757; 33/758
[58] Field of Search ................. 33/755, 757, 758, 761, 33/769, 770; 242/84.8

[56] References Cited

U.S. PATENT DOCUMENTS

| | | |
|---|---|---|
| D. 255,881 | 7/1980 | Atienza . |
| 530,111 | 12/1894 | Krebs . |
| 1,303,756 | 5/1919 | Ballou . |
| 1,407,429 | 2/1922 | Simmons . |
| 1,973,843 | 9/1934 | Buck . |
| 2,063,422 | 12/1936 | Farrand . |
| 2,629,935 | 3/1953 | Roe . |
| 2,686,367 | 8/1954 | Staggs . |
| 2,770,883 | 11/1956 | Hackney . |
| 3,036,791 | 5/1962 | Siggelkow . |
| 3,042,338 | 7/1962 | Ljungberg . |
| 3,100,937 | 8/1963 | Burch . |
| 3,141,628 | 7/1964 | Evans et al. .......................... 33/769 |
| 3,393,454 | 7/1968 | Creighton . |
| 3,418,719 | 12/1968 | Davis . |
| 3,473,235 | 10/1969 | Quenot . |
| 3,526,964 | 9/1970 | Clark . |
| 4,023,277 | 5/1977 | Fizer . |
| 4,103,426 | 8/1978 | Robin . |
| 4,215,829 | 8/1980 | Boyllin . |
| 4,288,923 | 9/1981 | Duda . |
| 4,296,554 | 10/1981 | Hammerstrom . |
| 4,300,289 | 11/1981 | DeHaven . |
| 4,551,847 | 11/1985 | Caldwell ............................... 33/755 |
| 4,574,486 | 3/1986 | Drechsler ............................. 33/771 |
| 4,578,867 | 4/1986 | Czerwinski et al. ................. 33/761 |
| 4,679,325 | 7/1987 | Sweatman . |
| 4,760,648 | 8/1988 | Doak et al. ........................... 33/761 |

FOREIGN PATENT DOCUMENTS

| | | | |
|---|---|---|---|
| 1193853 | 9/1985 | Canada . | |
| 0170114 | 1/1960 | Switzerland ......................... 33/761 |

OTHER PUBLICATIONS

Photographs of Sears Tape Rule with TVF-TIP Hook (date unknown).
Photographs of ServiStar Tape Rule (date unknown).
Photographs of Lufkin Tape Rule (date unknown).
Justus Roe & Sons, Inc. Brochure (date unknown).

Primary Examiner—William A. Cuchlinski, Jr.
Assistant Examiner—Christopher W. Fulton

[57] ABSTRACT

A spring powered coilable rule has a coilable metal tape with a tape hook at the end thereof. The tape hook has an elongated body portion extending along the surface of the tape a length greater than the width of the tape and a depending leg portion which has an upper end dimensioned and configured to overlie the outer edge of the tape in its uncoiled state. The body portion tapers in width from the leg portion to a reduced width, and at least three rivets are spaced axially along the length of the body portion to secure the tape hook to the tape.

8 Claims, 3 Drawing Sheets

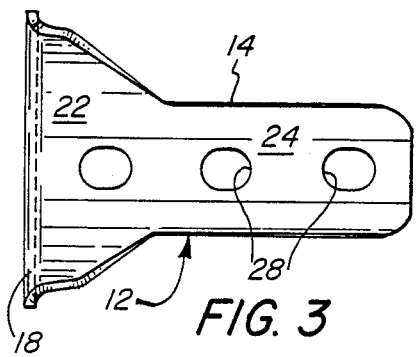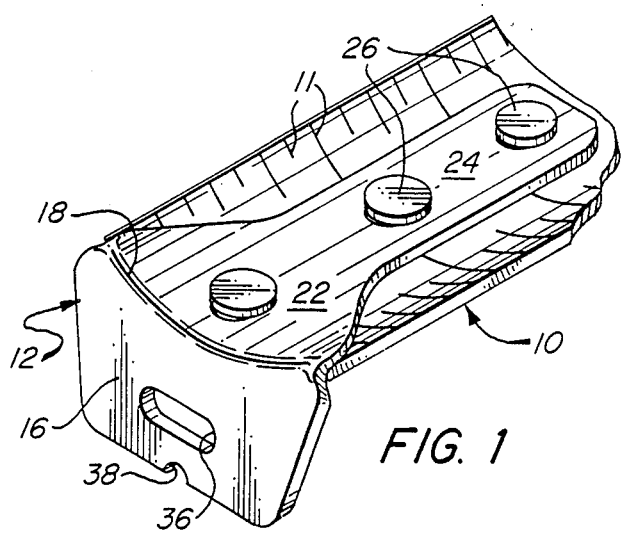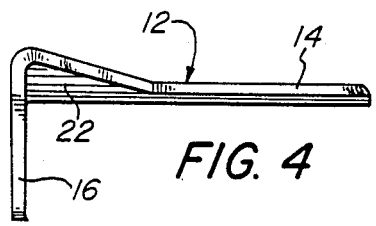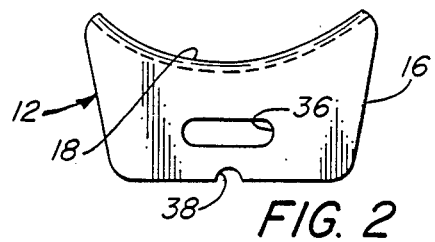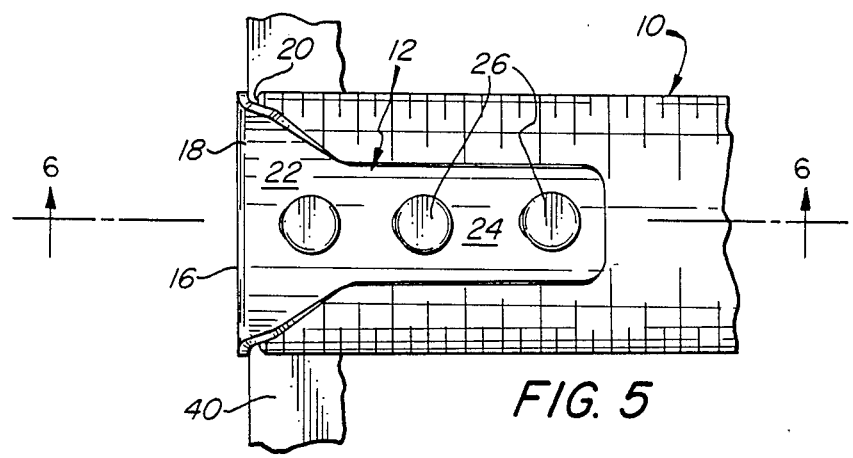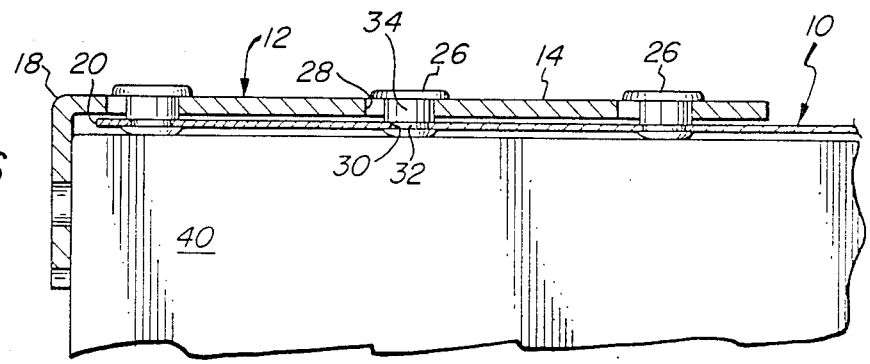

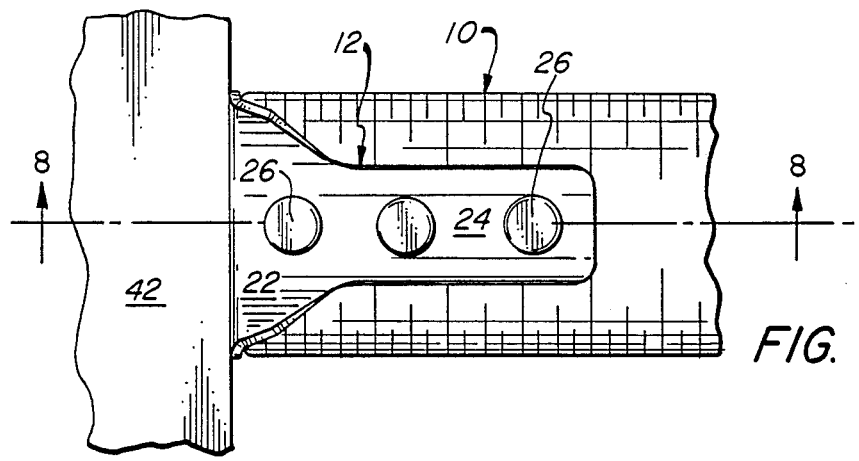
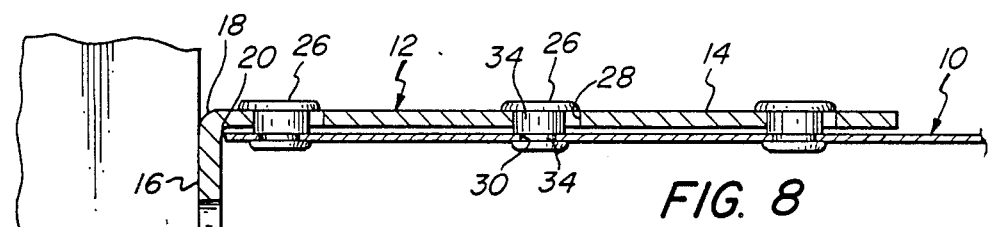
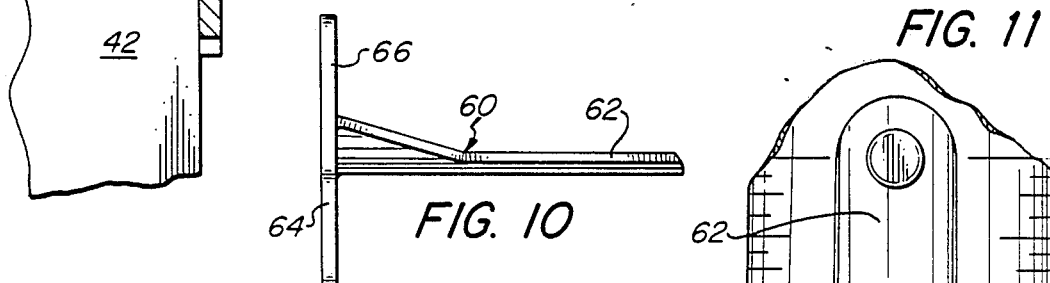
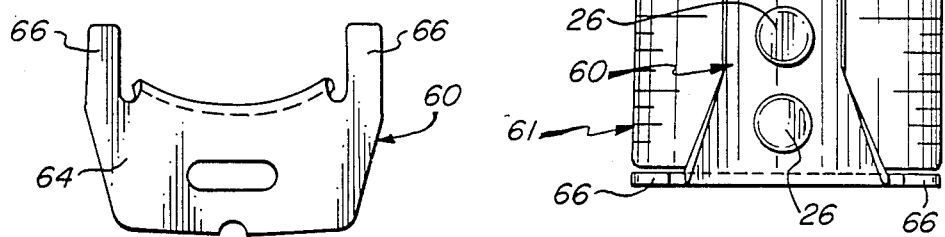
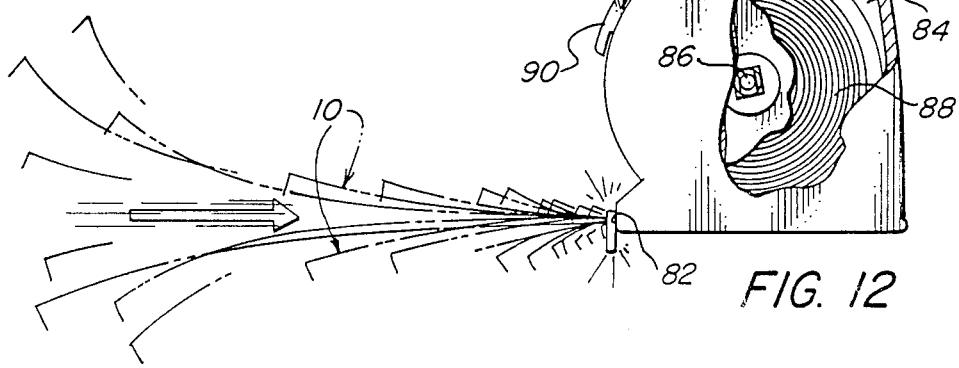

COILABLE TAPE RULE WITH IMPROVED END HOOK

BACKGROUND OF THE INVENTION

The present invention relates to coilable tape rules, and more particularly, to such tape rules having an improved hook at the end thereof to reduce fatigue during repeated retraction of the tape into the casing.

Coilable metal tape rules are widely employed to facilitate measurement and return of the extended tape into the casing for storage and carrying purposes. Generally, the tapes are fabricated of metal and have an element secured to their outer end which is generally referred to as a hook so that the outer end of the tape rule may be engaged over (or against) a surface from which the measurement is to be taken. Generally the tape hook is a bent metal strip secured to the metal blade by rivets, although some tape hooks are far more complex in structure.

The spring motors utilized to retract the uncoiled tape into the casing are generally quite powerful, particularly with respect to longer tapes, and the speed of retraction is frequently substantial and subject to variation as the size of the coil increases. Because there is frequently an extended length of tape projecting from the case, and the aperture into the casing provides an effective pivot point, there is a tendency for the extended length of tape to flex or whip as it is being withdrawn into the casing. The mass of the tape hook is frequently such as to provide a second point of pivoting or flexure for the extended tape with the metal tape bending about the inner end of the hook. Moreover, if the lower surface of the tape adjacent the hook is not flush against the workpiece over which it is disposed, the pull exerted on the tape causes flexure about the end of the hook and may cause the end of the hook to mar the surface of the workpiece. As a result of this repeated flexing, there is a tendency for the metal of the tape to fatigue at the inner end of the hook.

Moreover, since the retraction of the blade into the casing is stopped rather abruptly by the abutment of the tape hook against the wall of the casing about the aperture, there is also a tendency for the shock loading about the rivets or other means for fastening the tape hook to the metal tape to produce fatigue in, and shearing action on the metal tape. As a result, it is quite common for the metal tapes to fracture in the area of the tape hook and require replacement.

It is an object of the present invention to provide a coilable tape rule having a novel assembly of tape hook end coilable tape which reduces fatigue and shearing action on the metal tape.

It is also an object to provide such coilable tape rule in which the elements may be simply and readily fabricated and assembled.

Another object is to provide such a coilable metal rule in which the tape hook overlies the outer edge of the metal tape so as to substantially prevent the user from coming into contact with the relatively sharp corners at the outer edge and being injured thereby.

SUMMARY OF THE INVENTION

It has now been found that the foregoing and related objects and advantages may be readily attained in a coilable tape rule which has a housing providing a chamber therewithin and a peripheral wall with an aperture therethrough. In the housing are a spring motor and an elongated metallic tape coiled about the spring motor with its inner end coupled to the spring motor and its outer end extending outwardly through the aperture. On the outer end of the tape is an elongated hook having an elongated body portion extending axially of the tape a distance greater than the transverse dimension of the tape. The hook also has a depending leg portion at the outer end of the body portion, and the upper end of the depending portion is configured and dimensioned to substantially conform to the outer edge of the tape in its extended state. The body portion tapers inwardly from the leg portion to a reduced width, and at least three fastening members are spaced axially along, and secured in apertures in, the outer end of the tape and in the body portion of the hook. During use and upon rapid retraction of the tape into the housing, the elongated hook reduces fatigue and shear on the tape as it is used and being retracted.

In its preferred form, the tape in its uncoiled state and the body portion of the hook are of cooperating arcuate cross section, and the upper edge of the leg portion of the hook conforms to the arcuate cross section of the tape in its uncoiled state. The body portion has a substantially parallel sided section of reduced width extending inwardly from the inwardly tapering section, and the hook is dimensioned and configured to overlie substantially the full width of the outer edge of the tape in its uncoiled state.

Desirably, the apertures in the hook are axially elongated slots and the fastening elements are rivets with heads of greater width than the width of the slots. The hook may also include upwardly extending ears at the side margins of the leg portion. Most desirably, the length of the body portion is at least 1¼ times the transverse dimension of the tape.

BRIEF DESCRIPTION OF THE DRAWINGS

FIG. 1 is a fragmentary perspective view of the outer end of the coilable metal tape of a tape rule embodying the present invention;

FIG. 2 is a front elevational view of the tape hook of FIG. 1;

FIG. 3 is a top plan view thereof;

FIG. 4 is a side elevational view thereof;

FIG. 5 is a plan view of the fragmentary end portion of the tape with the hook engaged over the end of a fragmentarily illustrated workpiece;

FIG. 6 is a fragmentary sectional view along the line 6—6 of FIG. 5 and drawn to an enlarged scale;

FIG. 7 is a fragmentary plan view of the end portion of the tape abutting a fragmentarily illustrated workpiece;

FIG. 8 is a fragmentary sectional view along the line 8—8 of FIG. 7 and drawn to an enlarged scale;

FIG. 9 is a front elevational view of another embodiment of tape hook;

FIG. 10 is a side elevational view thereof;

FIG. 11 is a fragmentary plan view of the end portion of a tape utilizing the hook of FIGS. 9 and 10;

FIG. 12 is a partially diagrammatic view of a tape rule embodying the present invention with the whipping action of the outer end of the tape as it is being drawn into the casing being shown diagrammatically;

DETAILED DESCRIPTION OF THE ILLUSTRATED EMBODIMENT

Figure 14:
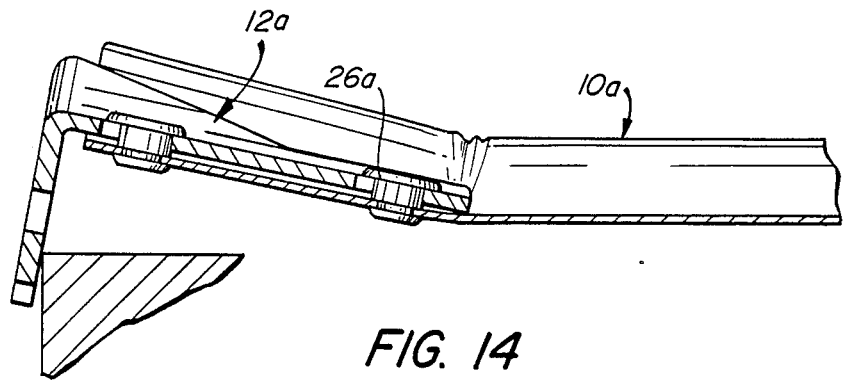
FIG. 14 is a similar view of a tape using a prior art hook.

Turning first to FIGS. 1-3, therein illustrated is the outer end of a coilable metal tape generally designated by the numeral 10 and having a concavely arcuate cross section and linear graduations 11 therealong. Affixed to the outer end of the tape 10 is a tape hook generally designated by the numeral 12 and having an elongated body portion 14 extending axially of the tape 10 and a depending leg portion 16 which overlies the outer edge of the tape 10.

As can best be seen in FIG. 1 (and FIG. 5), the leg portion 16 is dimensioned and configured so that its upper end will substantially span the entire edge 20 (seen in FIGS. 5 and 6) of the tape 10 in its arcuate configuration, thus protecting the user from the generally sharp corners at the edge 20 of the tape 10. The body portion 14 has a tapered section 22 which tapers in width inwardly from the wide upper end 18 of the leg portion 16, and a relatively narrow, parallel sided section 24 at its inner end. To conform to the arcuate cross section of the tape 10, the upper end 18 of the leg portion 16 and the cross section of the body portion 14 are of cooperatively arcuate cross section.

The hook 12 is secured to the tape 10 by three rivets 26 which extend through axially spaced and axially elongated apertures or slots 28 in the body portion 14 of the hook 12 and smaller diameter circular apertures 30 in the tape 10. The shanks of the rivets 26 have small diameter portion 32 which passes through the apertures 30 in the tape 10 and the bottom end of the shank is headed to secure the rivet 26 firmly thereto. The shank has a larger diameter upper portion 34 which is slidable in the apertures 28 of the hook 12 and which is headed to couple the hook 12 to the tape 10 while permitting limited sliding motion therebetween.

The length of the body portion 14 of the hook 12 must be greater than the width of the tape 10 and is preferably at least 1¼ times the width. The elongated apertures 18 should provide limited sliding motion of the rivets 26 therein equivalent to the thickness of the hook 12.

The leg portion 16 of the hook 12 desirably includes a aperture 36 to secure it to a nail or the like and a notch 38 to receive the pencil point when moving the rule and a pencil to scribe a line on a workpiece.

In FIGS. 5 and 6, one use of the rule is illustrated wherein the leg portion 16 of the hook 12 is disposed over the end of workpiece 40 and the hook 12 slides outwardly on the tape 10 a distance equal to its thickness to provide a true zero measurement from its inside surface. In FIGS. 7 and 8, the hook 12 abuts a wall or the like 42 and slides inwardly to provide true zero measurement from its outer surface.

In FIGS. 9-11, an alternate embodiment of the hook is generally designated by the numeral 60 and has an elongated body portion 62, a leg portion 64, and a pair of upstanding ears 66 on the leg portion 64. In this embodiment, the ears 66 extend in the plane of the body of the depending leg portion 64 and cooperate with the arcuate central portion to cover the outer edge of the tape 61. The ears 66 also allow the hook to be engaged under a workpiece (not shown).

In FIG. 12, there is diagrammatically illustrated a coilable tape rule embodying the present invention and having a casing generally designated by the numeral 80 with an entrance aperture 82 in its peripheral wall and providing a chamber 84 therewithin. Coiled within the chamber 84 about the hub 86 is a spring motor 88 and the coilable tape 10 which extends outwardly through the aperture 82. After measurement, the lock 90 is released and the coilable tape 10 is rapidly drawn into the housing 80 and coiled. Because of its flexibility, the outer end portion of the tape 10 tends to oscillate or whip as it is drawn towards the aperture 82, as schematically illustrated.

As seen in FIG. 14, a tape 10a employing a hook 12a of conventional length tends to bend about the inner end of the hook 12a when not seated flush over the top surface of a workpiece, and during the repeated whipping action. The shock loading about the rivet 26a connections to the tape 10a when the hook 12a abuts the wall of the casing 80 about the aperture 82 and this bending action tend to produce fatigue and ultimately fracturing of the tape 10a in the area of the hook 12a.

Figure 13:
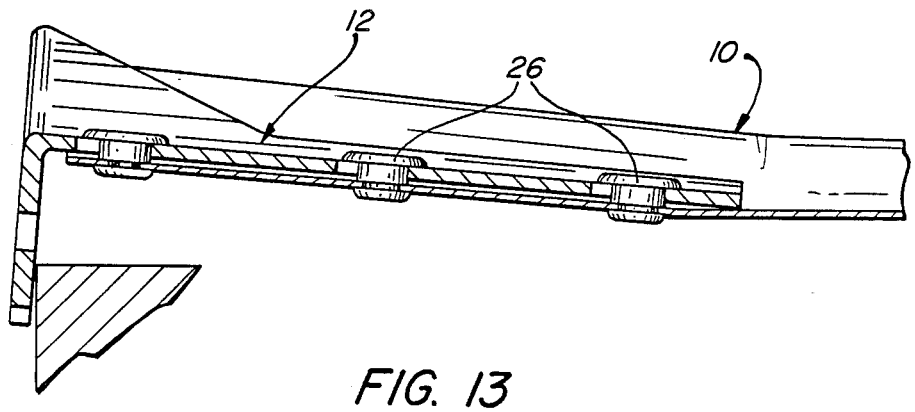
FIG. 13 is a fragmentary sectional view to an enlarged scale of the outer end of the tape having a hook of the present invention as it bends about the inner end of the hook during use and during the whipping action.

As seen in FIG. 13, tapes employing the elongated hook 12 of the present invention are found to bend to a much lesser degree about the inner end of the hook 12 because of the greater stability provided by the elongated hook and the shear forces upon impact against the casing are distributed over three or more rivets and a relatively large cross sectional area.

As indicated in the attached drawings, the preferred cross section for the tape is concavely arcuate, although other cross sectional configurations may also be employed such as those where there is an arcuate center section and generally linear outer sections. As is well known, sections of this type increase the stiffness of the tape, and thereby increase the standout length, i.e., the extended length of the tape projecting from the case without support. Moreover, such cross sections require flattening of the tape as it is withdrawn into the case, and this has the effect of slowing down the speed of retraction to minimize the force or impact on the tape hook when the retraction is completed.

The tapes are generally imprinted with the graduations and numeric indicia, and they are frequently encased in a plastic film or provided with a plastic coating to improve abrasion and wear resistance.

Thus, it can be seen from the foregoing detailed description and the attached drawings that the tape rules of the present invention employ an improved tape hook construction which will exhibit desirably longer life, while at the same time avoiding the cost and problems presented by some of the complex constructions which have heretofore been proposed to deal with such problems. The tape hook may be simply fabricated from sheet metal stock and is readily assembled to the end of the tape to provide a relatively long lived structure.

Having thus described the invention, what is claimed is:

1. In a coilable tape rule, the combination comprising:
  (a) a housing providing a chamber therewithin and having a peripheral wall with an aperture therethrough;
  (b) a spring motor in said housing;
  (c) an elongated metallic tape coiled in said housing about said spring motor and having its inner end coupled to said spring motor and its outer end extending outwardly through said aperture;

(d) an elongated hook on said outer end of said tape, said hook having an elongated body portion extending axially of said tape a distance greater than the transverse dimension of said tape, said hook also having a depending leg portion at the outer end of said body portion with its upper end configured and dimensioned to substantially conform to the outer edge of said tape in its extended state, said leg portion extending closely adjacent said outer edge of said tape, said body portion tapering inwardly from said leg portion to a reduced width, said tape in its uncoiled state and said body portion of said hook being of cooperating arcuate cross section; and (e) at least three fastening members spaced axially along and secured in apertures in said outer end of said tape and in said body portion of said hook, said fastening members having head portions at either end bearing directly against the outer surfaces of said blade and said hook respectively, said apertures in said hook being axially elongated slots, and said heads bearing against said hook being of greater width tab said slots.

2. The coilable tape rule in accordance with claim 1 wherein the upper edge of said leg portion of said hook conforms to said arcuate cross section of the tape in its uncoiled state.

3. The coilable tape rule in accordance with claim 1 wherein said body portion has a substantially parallel sided section of reduced width extending inwardly from the inwardly tapering section.

4. The coilable tape rule in accordance with claim 1 wherein said hook is dimensioned and configured to overlie substantially the full width of the outer edge of said tape in its uncoiled state.

5. The coilable tape rule in accordance with claim 1 wherein said hook includes upwardly extending ears at the side margins of said leg portion.

6. The coilable tape rule in accordance with claim 1 wherein the length of said body portion is at least $1\frac{1}{4}$ times the transverse dimension of said tape.

7. In a coilable tape rule, the combination comprising:
(a) a housing providing a chamber therewithin and having a peripheral wall with an aperture therethrough;
(b) a spring motor in said housing;
(c) an elongated metallic tape coiled in said housing about said spring motor and having its inner end coupled to said spring motor and its outer end extending outwardly through said aperture;
(d) an elongated hook on said outer end of said tape, said hook having an elongated body portion extending axially of said tape a distance greater than the transverse dimension of said tape, said hook also having a depending leg portion at the outer end of said body portion with its upper end configured and dimensioned to substantially conform to the outer edge of said tape in its extended state, said leg portion extending closely adjacent said outer edge of said tape, said body portion tapering inwardly from said leg portion to a reduced width, said tape in its uncoiled state and said body portion of said hook being of cooperating arcuate cross section; and
(e) at least three fastening members spaced axially along and secured in apertures in said outer end of said tape and in said body portion of said hook, said fastening members having head portions at either end bearing directly against the outer surfaces of said blade and said hook respectively, said apertures in said hook being axially elongated slots and, said heads bearing against said hook being of greater width than said slots.

8. The coilable tape rule in accordance with claim 7 wherein the length of said body portion is at least $1\frac{1}{4}$ times the transverse dimension of said tape.

* * * * *

UNITED STATES PATENT AND TRADEMARK OFFICE
CERTIFICATE OF CORRECTION

PATENT NO. : 4,930,227
DATED : June 5, 1990
INVENTOR(S) : Paul A. Ketchpel

It is certified that error appears in the above-identified patent and that said Letters Patent is hereby corrected as shown below:

Column 5, Line 23, after "width" delete "tab" and insert --than--.

Signed and Sealed this

Fourteenth Day of May, 1991

Attest:

HARRY F. MANBECK, JR.

Attesting Officer

Commissioner of Patents and Trademarks